United States Patent
Thaker et al.

(10) Patent No.: US 11,696,251 B2
(45) Date of Patent: Jul. 4, 2023

(54) SYSTEMS AND METHODS FOR MINIMIZING RISK TO WIRELESS BACKUP SERVICES

(71) Applicant: Verizon Patent and Licensing Inc., Basking Ridge, NJ (US)

(72) Inventors: Dhaval V. Thaker, Wesley Chapel, FL (US); Gayathri Sundararajan, Tampa, FL (US); Vikram K Rawat, Flower Mound, TX (US); Toyo Valdes, Chandler, AZ (US)

(73) Assignee: Verizon Patent and Licensing Inc, Basking Ridge, NJ (US)

( * ) Notice: Subject to any disclaimer, the term of this patent is extended or adjusted under 35 U.S.C. 154(b) by 171 days.

(21) Appl. No.: 17/152,481

(22) Filed: Jan. 19, 2021

(65) Prior Publication Data

US 2022/0232510 A1   Jul. 21, 2022

(51) Int. Cl.
*H04W 64/00* (2009.01)
*H04W 84/12* (2009.01)
*H04B 7/08* (2006.01)
*H04W 4/02* (2018.01)

(52) U.S. Cl.
CPC ........ *H04W 64/003* (2013.01); *H04B 7/0814* (2013.01); *H04W 4/02* (2013.01); *H04W 84/12* (2013.01)

(58) Field of Classification Search
CPC ...... H04B 7/0814; H04W 84/12; H04W 4/02; H04W 64/003
See application file for complete search history.

(56) References Cited

U.S. PATENT DOCUMENTS

| | | | | |
|---|---|---|---|---|
| 9,510,251 | B2* | 11/2016 | Sidhu | H04B 17/318 |
| 10,104,608 | B2* | 10/2018 | Strong | H04W 48/20 |
| 10,660,005 | B1* | 5/2020 | Lin | H04W 36/245 |
| 10,992,972 | B1* | 4/2021 | Zhang | H04W 64/006 |
| 2006/0114818 | A1* | 6/2006 | Canali | H04L 45/22 370/242 |
| 2008/0019266 | A1* | 1/2008 | Liu | H04L 45/50 370/228 |
| 2020/0229086 | A1* | 7/2020 | Monajemi | H04W 72/1278 |
| 2020/0322369 | A1* | 10/2020 | Raghuramu | H04L 63/1433 |

\* cited by examiner

*Primary Examiner* — Charles N Appiah
*Assistant Examiner* — Nicole M Louis-Fils

(57) ABSTRACT

A device may receive data identifying a quantity of wireless network devices, distance data identifying distances from the wireless network devices to a geographical location, data identifying signal strengths of the wireless network devices, carrier data identifying wireless and wireline carriers for the wireless network devices, or path data identifying wireline paths for the wireless network devices and wireline network devices. The device may assign scores to the quantity, the distance data, the signal strengths, the carrier data, or the path data to generate scores, and may combine the scores to generate a diversity risk score. The device may compare the diversity risk score to a diversity risk threshold scale and may determine whether the diversity risk score satisfies thresholds of the diversity risk threshold scale based on the comparison. The device may perform actions based on whether the diversity risk score satisfies the thresholds.

20 Claims, 10 Drawing Sheets

US 11,696,251 B2

1

SYSTEMS AND METHODS FOR MINIMIZING RISK TO WIRELESS BACKUP SERVICES

BACKGROUND

A customer may receive network services from a wireline network via network paths (e.g., optical cables) provided between wireline network devices (e.g., routers) and a data network (e.g., an Internet protocol (IP) network). The customer may receive wireless backup network services from wireless network devices (e.g., base stations, such as eNodeBs and gNodeBs) if the wireline network experiences an outage.

DETAILED DESCRIPTION OF PREFERRED EMBODIMENTS

Figure 1A:
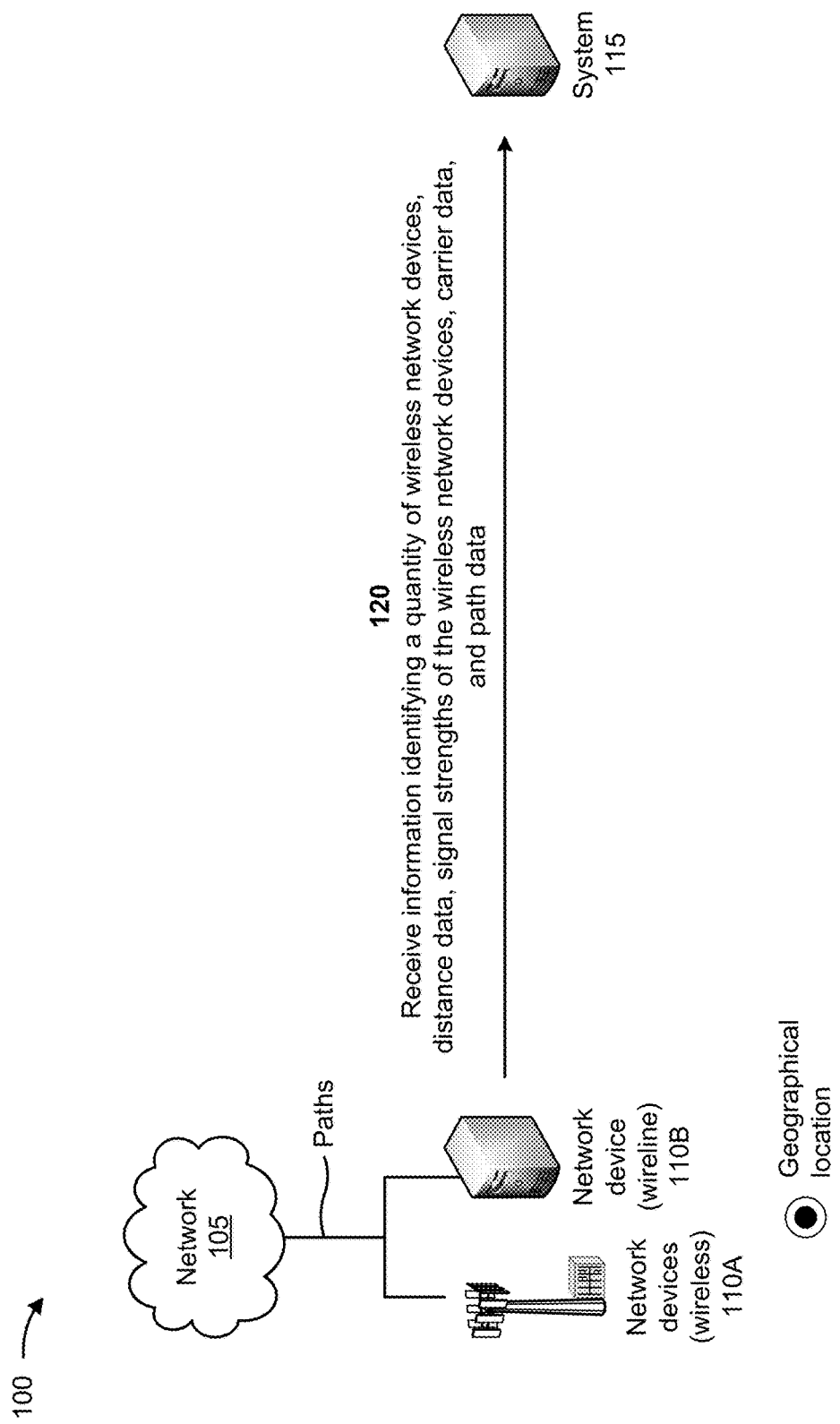
FIGS. 1A-1G are diagrams of an example associated with a system for analyzing a diversity risk score and applying the diversity risk score to wireless backup services.

The following detailed description of example implementations refers to the accompanying drawings. The same reference numbers in different drawings may identify the same or similar elements.

In some cases, different types of network devices (e.g., wireline network devices and wireless network devices) may share one or more network paths to a data network. Such shared network paths may decrease a diversity of the network devices in the event of an outage associated with the shared network paths. For example, if a wireline network device and a wireless network device share the same network path to the data network, the wireless network cannot provide backup network services if the shared network path experiences an outage. However, identifying the shared network paths and determining a diversity risk (e.g., a risk that an outage in a shared network path prevents a wireless network from providing backup network services to a wired network) for network customers is a time consuming, manual process. A failure to properly identity the shared network paths and determine diversity risk may cause a lack of visibility into wireline and wireless network path commonalities, which may lead to outages for enterprise customers when the wireline and wireless network paths are not diverse (e.g., share a common path to a data network).

Some implementations described herein provide a system that calculates a diversity risk score and applies the diversity risk score to wireless backup services. For example, the system may receive one or more of data identifying a quantity of wireless network devices available for service in a geographical location, distance data identifying distances from the wireless network devices to the geographical location, data identifying signal strengths of the wireless network devices, carrier data identifying wireless and wireline carriers for the wireless network devices, or path data identifying wireline paths for the wireless network devices

2 and wireline network devices. The system may assign scores to the one or more of the quantity, the distance data, the signal strengths, the carrier data, or the path data to generate a plurality of scores, and may combine the plurality of scores to generate a diversity risk score for the geographical location. The system may compare the diversity risk score to a diversity risk threshold scale and may determine whether the diversity risk score satisfies one or more thresholds of the diversity risk threshold scale based on comparing the diversity risk score to the diversity risk threshold scale. The system may perform one or more actions based on whether the diversity risk score satisfies the one or more thresholds of the diversity risk threshold scale. For example, the system may cause one or more parameters to be changed for one of the wireless network devices, may cause traffic to be rerouted from a path associated with one of the wireless network devices to a different path, may cause an antenna of a wireless network device to be adjusted, and/or the like.

In this way, the system calculates a diversity risk score and applies the diversity risk score to wireless backup services. The system may calculate diversity scores and/or risk levels associated with wireline systems and wireless backup systems when the systems are created and/or operating. The system may provide improved diversity for wireline private IP services with backup from a wireless network service. The system may cause diversity issues to be automatically corrected and may monitor the corrections to address the diversity issues. Thus, the system conserves computing resources, networking resources, human resources, and/or the like associated with handling network outages, identifying shared network paths, handling consumer complaints associated with network outages, and/or the like.

FIGS. 1A-1G are diagrams of an example 100 associated with calculating a diversity risk score and applying the diversity risk score to wireless backup services for a wired network. As shown in FIGS. 1A-1G, example 100 includes a network 105, network devices 110, and a system 115. Network 105 may include a radio access network (RAN) associated with an LTE or 4G network, a 5G network, and/or the like. Each network device 110 may include an eNodeB (eNB) capable of transferring traffic, such as audio, video, text, and/or other traffic associated with network 105, a gNodeB (gNB) that supports, for example, a cellular radio access technology (RAT) and wireless communication for network 105, and/or the like. System 115 may include a system that calculates a diversity risk score and applies the diversity risk score to wireless backup services.

As shown in FIG. 1A, and by reference number 120, the system 115 may receive information identifying a quantity of wireless network devices 110A, distance data, signal strengths of the wireless network devices 110A, carrier data, and path data from network devices 110 associated with the network 105. For example, the system 115 may query the wireless network devices 110A and/or the wireline network device 110B and may receive the information identifying the quantity of wireless network devices 110A, the distance data, the signal strengths of the wireless network devices 110A, the carrier data, and/or the path data in response to the query. The information identifying a quantity of wireless network devices 110A may identify a quantity of wireless network devices 110A available for service in a geographical location. The geographical location may be associated with an entity (e.g., an enterprise customer) associated with the wireless network devices and/or the wireline network devices. The wireline network devices may provide a wireline private service for the entity at the geographical location and the wireless network devices may provide backup connectivity to the wireline private service.

The distance data may include information identifying distances from the wireless network devices 110A to the geographical location. The carrier data may include information identifying wireless and wireline carriers for the wireless network devices 110A. The path data may include information identifying paths for the wireless network devices 110A and wireline network devices 110B.

Figure 1B:
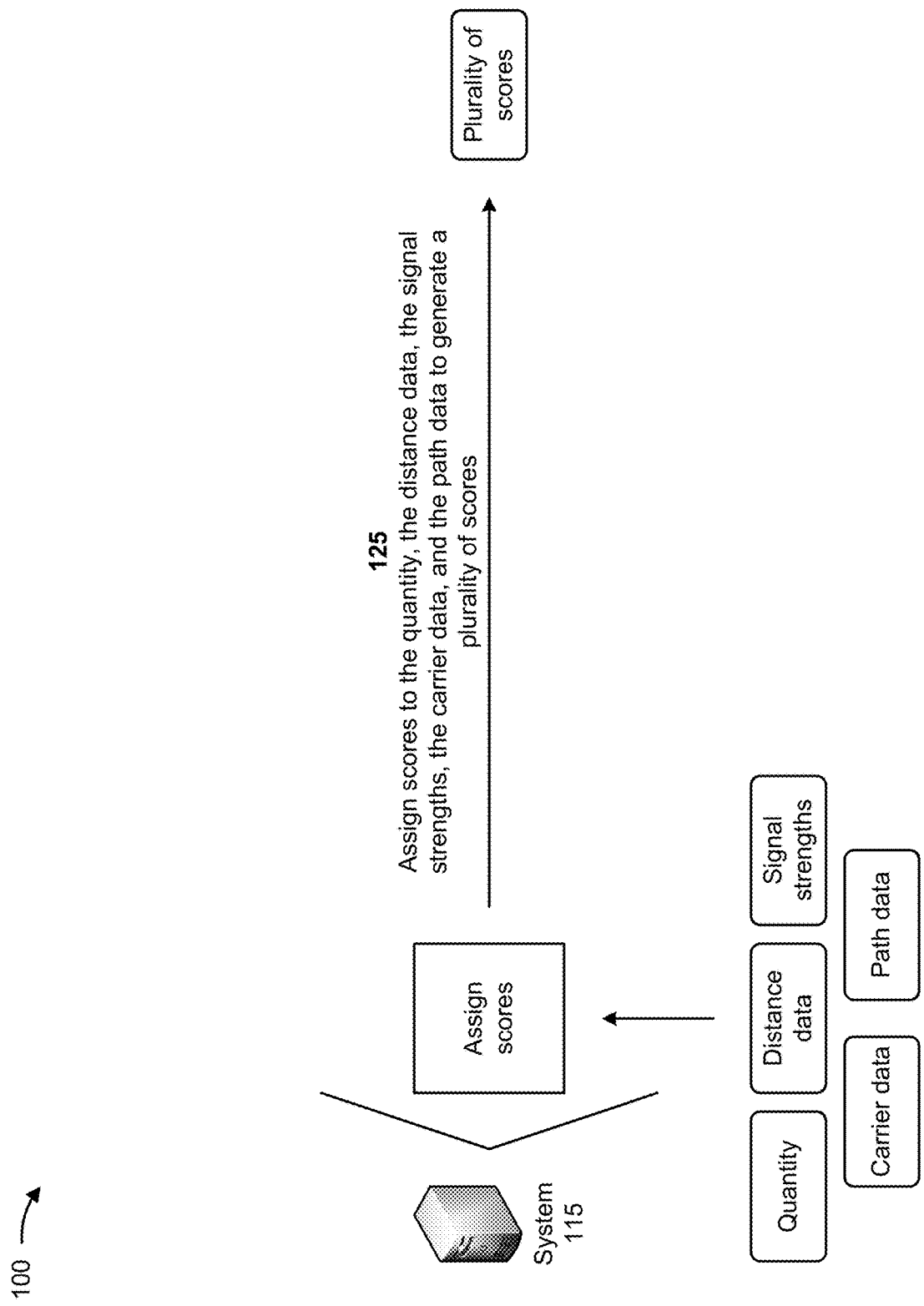

As shown in FIG. 1B, and by reference number 125, the system 115 assigns scores to the quantity of wireless network devices 110A available for service in the geographical location, the distance data, the signal strengths, the carrier data, and the path data to generate a plurality of scores. In some implementations, the system 115 may assign the scores based on accessing a data structure (e.g., a database, a table, a list, and/or the like) storing information associating ranges of values (e.g., ranges of quantities of wireless network devices available for service in the geographical location, ranges of distances from which a wireless network device is from the geographical location, ranges of signal strengths, ranges of quantities of last mile carriers, ranges of quantities of central office (CO) intersections associated with the path data, and/or the like) with respective scores associated with the ranges of values.

In some implementations, the plurality of scores includes a score associated with the quantity of wireless network devices 110A available for service in the geographical location. For example, the plurality of scores may include a first score (e.g., 0) when the quantity of wireless network devices 110A satisfies (e.g., is greater than or equal to) a quantity threshold (e.g., two, three, five, and/or the like). The plurality of scores may include a second score (e.g., 1) when the quantity of wireless network devices 110A fails to satisfy the quantity threshold. The plurality of scores may include a third score (e.g., 2) when the quantity of wireless network devices 110A is equal to zero.

In some implementations, the plurality of scores includes a respective score associated with distance data identifying a distance from each wireless network device 110A, of the quantity of wireless network devices 110A, to the geographical location. For example, the distance data identifying a distance from a wireless network device 110A to the geographical location may be assigned a first score (e.g., 0) when the distance satisfies a first distance condition (e.g., less than about three miles), a second score (e.g., 1) when the distance satisfies a second distance condition (e.g., between about three miles and about ten miles), and a third score (e.g., 2) when the distance satisfies a third distance condition (e.g., greater than about ten miles).

In some implementations, the plurality of scores include a score assigned to a signal strength associated with a wireless network device 110A. For example, the signal strength of a wireless network device 110A may be assigned a first score (e.g., 0) when the signal of the wireless network device 110A satisfies a first signal strength threshold. The signal strength of the wireless network device 110A may be assigned a second score (e.g., 1) when the signal of the wireless network device 110A satisfies a second signal strength threshold. The signal strength of the wireless network device 110A may be assigned a third score (e.g., 2) when the signal of the wireless network device 110A satisfies a third signal strength threshold.

In some implementations, the plurality of scores include a score assigned to the carrier data. For example, the carrier data may be assigned a first score (e.g., 0) when the wireline network devices 110B and the wireless network devices 110A utilize different last mile carriers. The carrier data may be assigned a second score (e.g., 1) when the wireline network devices 110B and the wireless network devices 110A utilize the same last mile carrier.

In some implementations, the plurality of scores include a score assigned to the path data. For example, the path data for a wireless network device 110A and/or a wireline network device 110B may be assigned a first score (e.g., 2) when a quantity of CO intersections associated with the path data satisfies a CO intersection threshold. The path data may be assigned a second score (e.g., 1) when the quantity of CO intersections fails to satisfy the CO intersection threshold. The path data may be assigned a third score (e.g., 0) when the quantity of CO intersections is equal to zero.

Figure 1C:
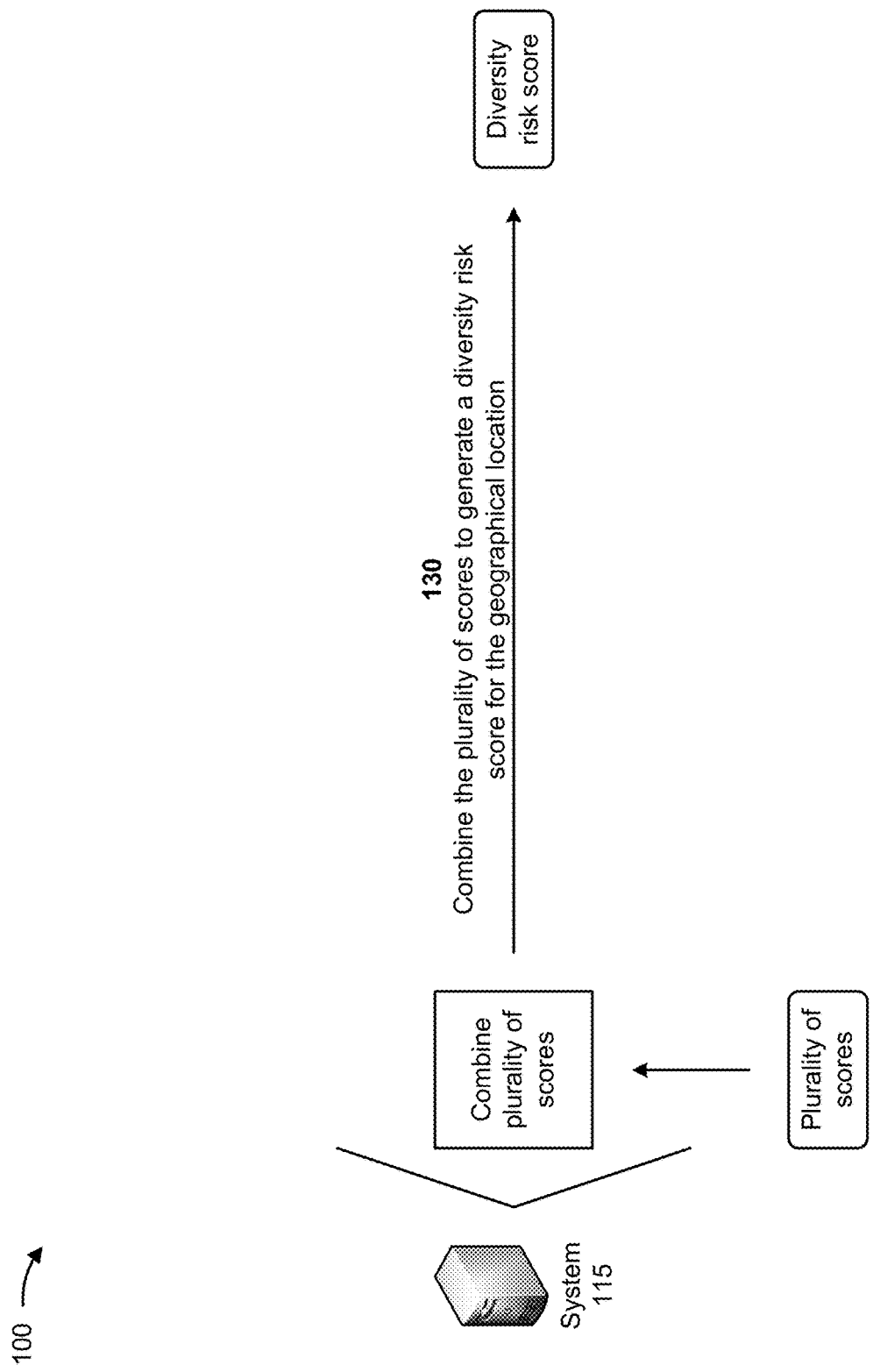

As shown in FIG. 1C, and by reference number 130, the system 115 combines the plurality of scores to generate a diversity risk score for the geographical location. For example, the system 115 may calculate a sum of the plurality of scores to generate the diversity risk score. The diversity risk score may indicate a risk associated with sharing of the wireline paths by the wireless network devices and the wireline network devices. In some implementations, the system 115 calculates a sum of the plurality of scores to generate a diversity risk score for the geographical location. Alternatively, and/or additionally, the system 115 may combine a group of scores, of the plurality of scores, to generate the diversity risk score. For example, the system 115 may combine a group of scores associated with a particular wireless network device 110A, a particular wireline network device 110B, the quantity of wireless network devices 110A, the distance data, the signal strengths, the carrier data, and/or the path data to generate a diversity risk score for geographical location, the particular wireless network device 110A, and/or the particular wireline network device 110B.

Figure 1D:
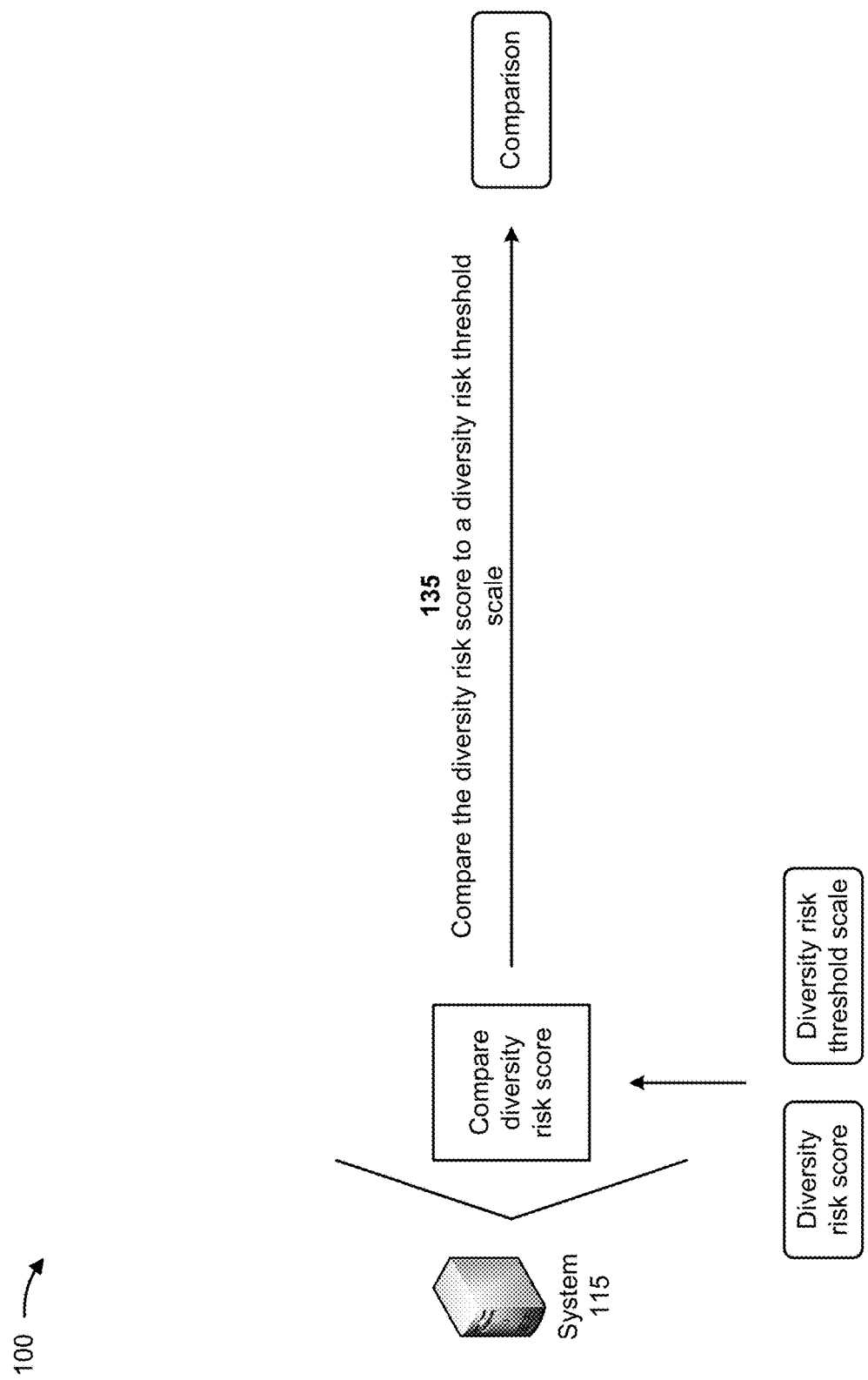

As shown in FIG. 1D, and by reference number 135, the system 115 compares the diversity risk score to a diversity risk threshold scale. The diversity risk threshold scale may be dependent on which of the one or more of the group of scores associated with the quantity of wireless network devices 110A, the distance data, the signal strengths, the carrier data, and/or the path data are utilized to generate the plurality of scores. For example, the system 115 may compare the diversity risk score to a first diversity risk score threshold scale when the system 115 combines the plurality of scores to generate the diversity risk score. The system 115 may compare the diversity risk score to a second diversity risk score threshold scale when the system 115 combines one or more groups of scores to generate the diversity risk score.

Figure 1E:
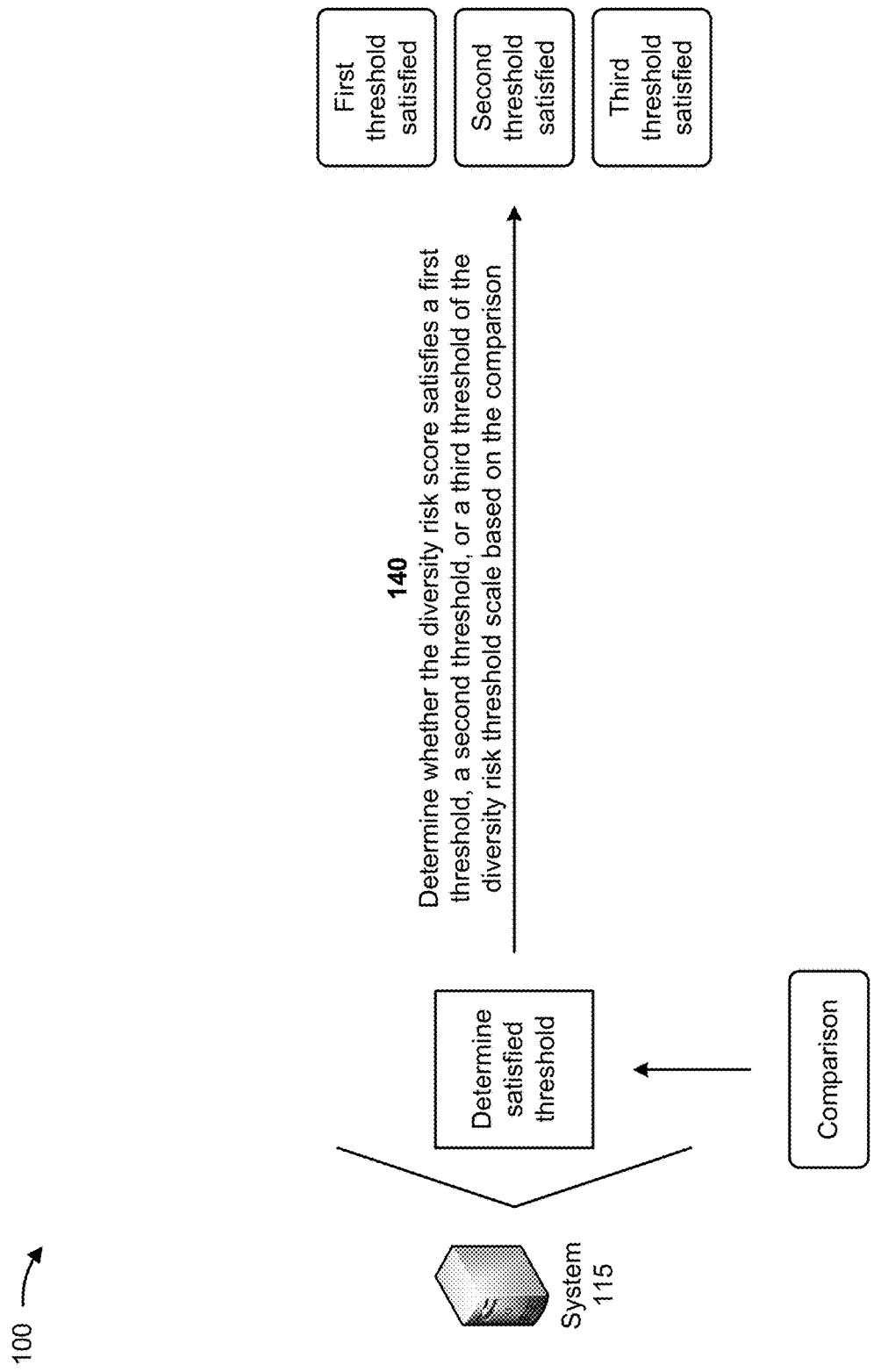

As shown in FIG. 1E, and by reference number 140, the system 115 determines whether the diversity risk score satisfies a first threshold, a second threshold, or a third threshold of the diversity risk threshold scale based on the comparison. The first threshold of the diversity risk threshold scale may be satisfied when the diversity risk score is within a range of diversity risk scores associated with a first diversity risk level. The second threshold of the diversity risk threshold scale may be satisfied when the diversity risk score is within a range of diversity risk scores associated with a second diversity risk level. The second diversity risk level may correspond to a level of risk that is less than a level of risk associated with the first diversity risk level. The third threshold of the diversity risk threshold scale may be satisfied when the diversity risk score is within a range of diversity risk scores associated with a third diversity risk level. The third diversity risk level may correspond to a level of risk that is less than the level of risk associated with the second diversity risk level.

For example, the first threshold may be associated with a high risk of the wireless network devices 110A being unable to provide backup connectivity for the wireline network devices 110B. The second threshold may be associated with a medium risk of the wireless network devices 110A being unable to provide backup connectivity for the wireline network devices 110B. The third threshold may be associated with a low risk of the wireless network devices 110A being unable to provide backup connectivity for the wireline network devices 110B.

Figure 1F:
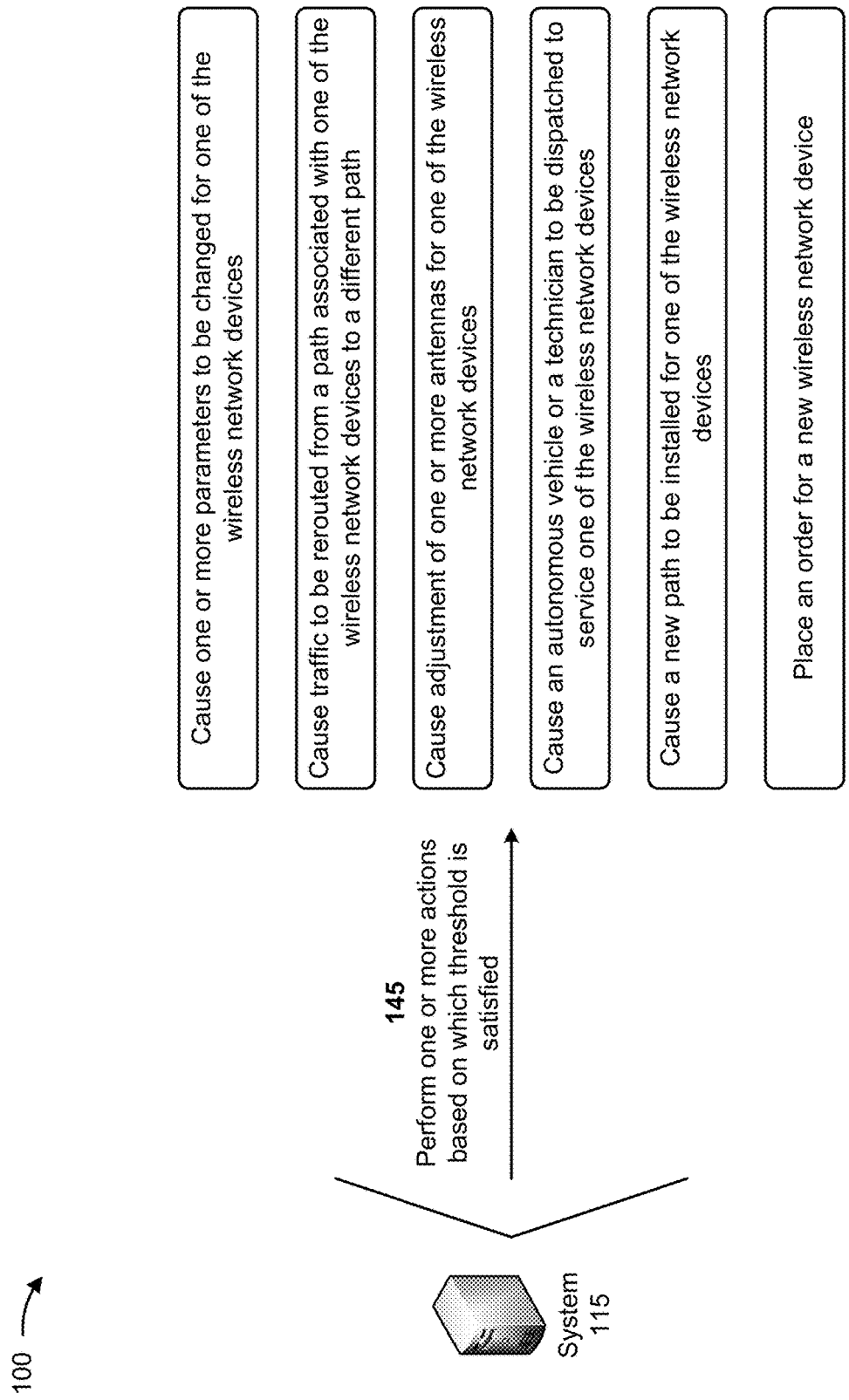

As shown in FIG. 1F, and by reference number 145, the system 115 performs one or more actions based on which threshold is satisfied. In some implementations, performing the one or more actions includes the system 115 causing one or more parameters to be changed for one of the wireless network devices 110A. The system 115 may cause one or more parameters to be changed for one of the wireless network devices 110A to enable the wireless network device 110A to provide backup connectivity for the wireline network devices 110B. For example, the system 115 may cause one or more parameters to be changed to increase a signal strength of the wireless network device 110A, to utilize a different last mile carrier, and/or the like.

In some implementations, performing the one or more actions includes the system 115 causing traffic to be rerouted from a path associated with one of the wireless network devices 110A to a different path and/or cause a new path to be installed for one of the wireless network devices 110A. For example, the system 115 may cause traffic to be rerouted from a path associated with a wireless network device 110A to a different path, associated with other networks proximate to the geographical location, and/or may cause a new path to be installed for a wireless network device 110A based on the risk diversity score satisfying the first threshold and/or the second threshold.

In some implementations, performing the one or more actions includes the system 115 causing an autonomous vehicle (e.g., a robot, an unmanned aerial vehicle, an autonomous car, an autonomous truck, and/or the like) or a technician to be dispatched to service one of the wireless network devices 110A. For example, the system 115 may cause an autonomous vehicle and/or a technician to be dispatched to a wireless network device 110A to service the network device 110 based on the risk diversity score satisfying the first threshold and/or the second threshold.

In some implementations, performing the one or more actions includes the system 115 placing an order for a new network device 110. For example, the system 115 may place an order for a new network device 110 to be allocated for the geographical location. In this way, system 115 may enable the network 105 to handle an increase in bandwidth utilization of the network 105, a decrease in capacity of the network 105, and/or the like. This may conserve computing resources, networking resources, human resources, and/or the like associated with the network 105 operating inefficiently, identifying network resources to allocate for the increased network utilization, handling consumer complaints associated with the network 105, and/or the like.

In some implementations, performing the one or more actions includes system 115 causing one or more additional network devices 110 to be temporarily allocated for the geographical location. For example, the system 115 may cause additional network devices 110, associated with other networks proximate to the geographical location, to be temporarily allocated for the geographical location. In this way, the system 115 may enable the network 105 and the one or more additional network devices 110 to handle an increase in bandwidth utilization of the network 105, a decrease in capacity of the network 105, and/or the like. This may conserve computing resources, networking resources, human resources, and/or the like associated with the network 105 operating inefficiently, identifying network resources to allocate for the increased network utilization, handling consumer complaints associated with the network 105, and/or the like.

In some implementations, performing the one or more actions includes the system 115 causing an autonomous vehicle equipped with a network device 110 to be dispatched to the geographical location. The network device 110 of the autonomous vehicle may provide additional service to users in the geographical location. In this way, the system 115 may enable the network 105 and the network device 110 of the autonomous vehicle to handle an increase in bandwidth utilization of the network 105, a decrease in capacity of the network 105, and/or the like. This may conserve computing resources, networking resources, human resources, and/or the like associated with network 105 operating inefficiently, identifying network resources to allocate for the increased network utilization, handling consumer complaints associated with the network 105, and/or the like.

In some implementations, performing the one or more actions includes the system 115 generating a notification about the anticipated behavior of the network 105 and providing the notification to users of the network 105 located in the geographical location. In this way, the users of the network 105 may be notified about an increase in bandwidth utilization of the network 105, a decrease in capacity of the network 105, and/or the like. This may conserve computing resources, networking resources, human resources, and/or the like associated with handling consumer complaints associated with the network 105.

In some implementations, performing the one or more actions includes the system 115 causing an order to be placed for a new network device 110 of the network 105 based on the anticipated behavior of the network. For example, the system 115 may determine that at least one additional network device 110 is needed whenever a power outage occurs in the geographical location. Thus, the system 115 may order the new network device 110 for the network 105 in order to handle network demands associated with future power outages. In this way, the network 105 and the new network device 110 may handle an increase in bandwidth utilization of the network 105, a decrease in capacity of the network 105, and/or the like associated with future power outages. This may conserve computing resources, networking resources, human resources, and/or the like associated with the network 105 operating inefficiently, identifying network resources to allocate for the increased network utilization, handling consumer complaints associated with the network 105, and/or the like.

In some implementations, performing the one or more actions includes the system 115 adjusting one or more parameters of one or more of network devices 110 based on the anticipated behavior of network 105. For example, the system 115 may adjust parameters of the one or more network devices 110 (e.g., a tilt angle of a base station, a power of a signal generated by a base station, and/or the like) so that the one or more network devices 110 may handle an increase in bandwidth utilization of the network 105, a decrease in capacity of the network 105, and/or the like. This, in turn, may conserve computing resources, networking resources, human resources, and/or the like associated with the network 105 operating inefficiently, identifying network resources to allocate for the increased network utilization, handling consumer complaints associated with the network 105, and/or the like.

In some implementations, performing the one or more actions includes the system 115 determining a network capacity requirement based on the anticipated behavior of network 105 and implementing an upgrade to the network 105 based on the network capacity requirement. For example, the system 115 may determine that at least one additional network device 110 is needed whenever a power outage occurs in the geographical location based on a network capacity requirement of the network 105 during the power outage. Thus, system 115 may cause a new network device 110 to be provided for the network 105 to handle the network capacity requirement of the network 105 during power outages. This may conserve computing resources, networking resources, human resources, and/or the like associated with the network 105 operating inefficiently, identifying network resources to allocate for the increased network utilization, handling consumer complaints associated with the network 105, and/or the like.

Figure 1G:
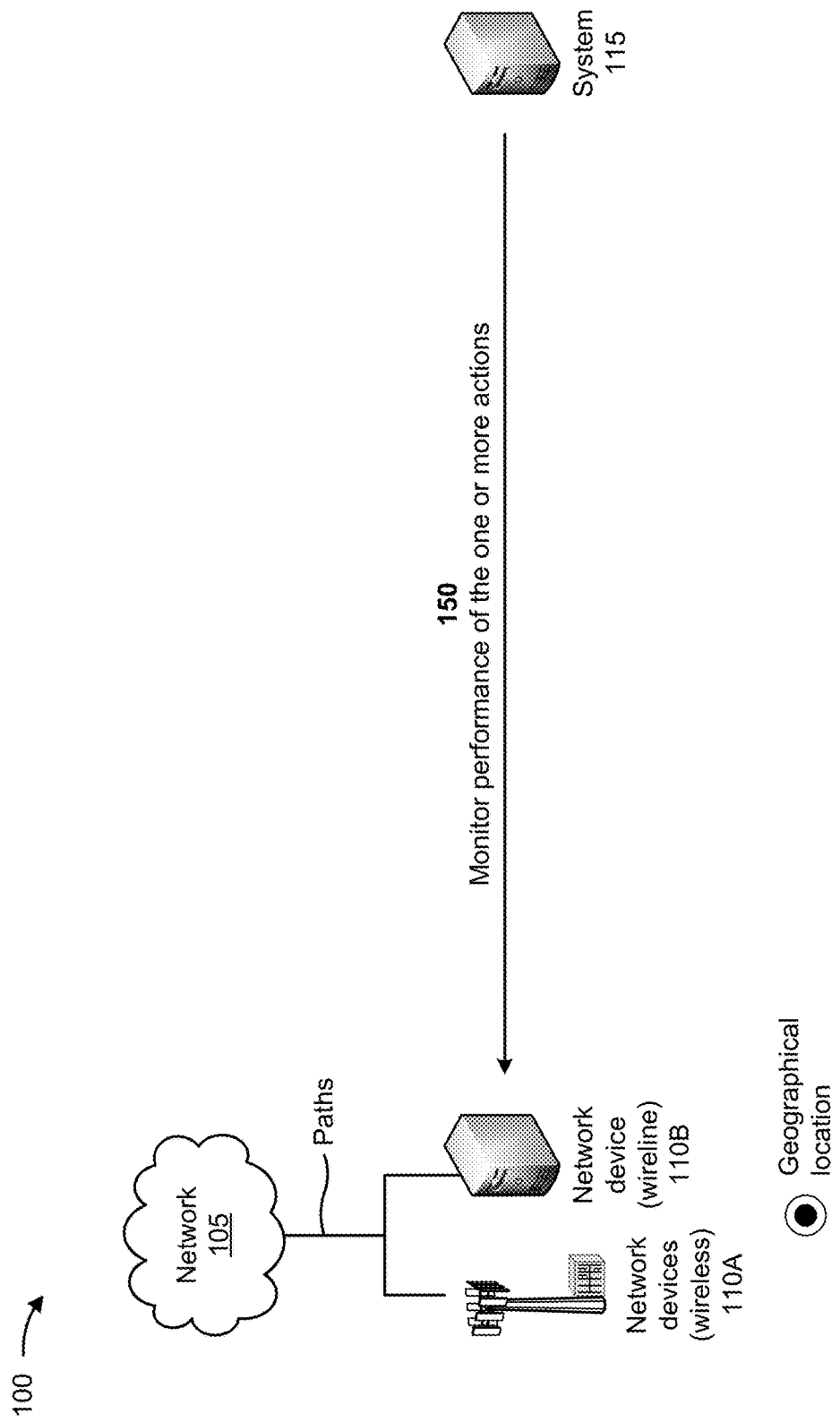

As shown in FIG. 1G, and by reference number 155, the system 115 monitors performance of the one or more actions. The system 115 may monitor the performance of the network 105 based on performing the one or more actions. For example, the system 115 may determine a new diversity risk score, may determine whether the new diversity risk score satisfies the first threshold, the second threshold, or the third threshold, and may perform one or more additional actions based on whether the new diversity risk score satisfies the first threshold, the second threshold, or the third threshold, in a manner similar to that described above.

In this way, the system 115 calculates a diversity risk score and applies the diversity risk score to wireless backup services. The system 115 may calculate diversity scores and/or risk levels associated with wireline systems and wireless backup systems when the systems are created and/or operating. The system 115 may provide improved diversity for wireline private IP services with backup from a wireless network service. The system 115 may cause diversity issues to be automatically corrected and may monitor the corrections to address the diversity issues. Thus, the system 115 conserves computing resources, networking resources, human resources, and/or the like associated with handling network outages, identifying shared network paths, handling consumer complaints associated with network outages, and/or the like.

As indicated above, FIGS. 1A-1G are provided as an example. Other examples may differ from what is described with regard to FIGS. 1A-1G. The number and arrangement of devices shown in FIGS. 1A-1G are provided as an example. In practice, there may be additional devices, fewer devices, different devices, or differently arranged devices than those shown in FIGS. 1A-1G. Furthermore, two or more devices shown in FIGS. 1A-1G may be implemented within a single device, or a single device shown in FIGS. 1A-1G may be implemented as multiple, distributed devices. Additionally, or alternatively, a set of devices (e.g., one or more devices) shown in FIGS. 1A-1G may perform one or more functions described as being performed by another set of devices shown in FIGS. 1A-1G.

Figure 2:
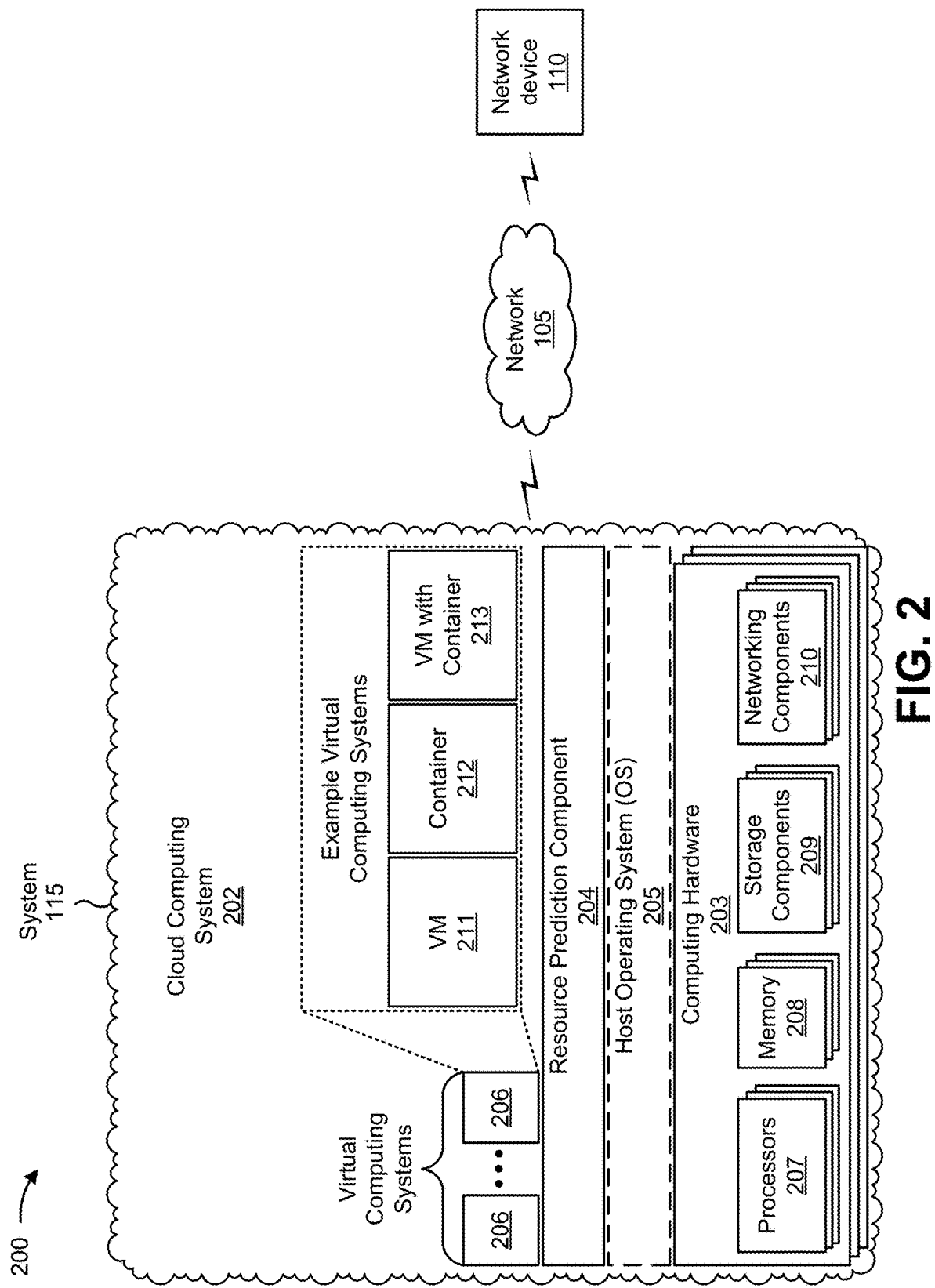
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include system 115, which may include one or more elements of and/or may execute within a cloud computing system 202. The cloud computing system 202 may include one or more elements 203-213, as described in more detail below. As further shown in FIG. 2, environment 200 may include network 105 and/or network device 110. Devices and/or elements of environment 200 may interconnect via wired connections and/or wireless connections.

Network 105 may include a RAN that includes one or more network device 110 that take the form of eNBs, gNBs, and/or the like, via which a user device (e.g., a mobile phone, a laptop computer, a tablet computer, a desktop computer, and/or the like) communicates with a core network. Network 105 may include one or more wired and/or wireless networks. For example, network 105 may include a cellular network (e.g., a 5G network, an LTE network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

Network device 110 includes one or more wireless network devices (e.g., wireless network devices 110A) and/or wireline network devices (e.g., wireline network devices 110B) capable of transferring traffic, such as audio, video, text, and/or other traffic, destined for and/or received from a UE. In some implementations, network device 110 may include an eNB associated with an LTE network that receives traffic from and/or sends traffic to a core network. Additionally, or alternatively, network device 110 may include a gNB associated with a RAN of a 5G network. Network device 110 may send traffic to and/or receive traffic from a UE via an air interface, such as a cellular RAT. In some implementations, network device 110 may include a base transceiver station, a radio base station, a base station subsystem, a cellular site, a cellular tower, an access point, a transmit receive point (TRP), a radio access node, a macrocell base station, a microcell base station, a picocell base station, a femtocell base station, a cellular-site router, an aggregation router, a core network device, and other network entities that can support wireless communication. Network device 110 may transfer traffic between UEs (e.g., using a cellular RAT), one or more other network devices 110 (e.g., using a wireless interface or a backhaul interface, such as a wired backhaul interface), and/or a core network.

In some implementations, network device 110 includes a wireline device, such as an optical multiplexer/demultiplexer, an optical switch, an optical splitter, an optical amplifier, an optical network terminal, and/or the like. Network device 110 may include a router, such as a label switching router (LSR), a label edge router (LER), an ingress router, an egress router, a provider router (e.g., a provider edge router, a provider core router, and/or the like), a virtual router, and/or the like. Additionally, or alternatively, network device 110 may include a gateway, a switch, a firewall, a hub, a bridge, a reverse proxy, a server (e.g., a proxy server, a cloud server, a data center server, and/or the like), a load balancer, and/or a similar device.

The cloud computing system 202 includes computing hardware 203, a resource management component 204, a host operating system (OS) 205, and/or one or more virtual computing systems 206. The resource management component 204 may perform virtualization (e.g., abstraction) of computing hardware 203 to create the one or more virtual computing systems 206. Using virtualization, the resource management component 204 enables a single computing device (e.g., a computer, a server, and/or the like) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, one or more storage components 209, and/or one or more networking components 210. Examples of a processor, a memory, a storage component, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, and/or the like) or a virtual machine monitor, such as when the virtual computing systems 206 are virtual machines 211. Additionally, or alternatively, the resource management component 204 may include a container manager, such as when the virtual computing systems 206 are containers 212. In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 211, a container 212, a hybrid environment 213 that includes a virtual machine and a container, and/or the like. A virtual computing system 206 may execute one or more applications using a file system that includes binary files, software libraries, and/or other resources required to execute applications on a guest operating system (e.g., within the virtual computing system 206) or the host operating system 205.

Although system 115 may include one or more elements 203-213 of the cloud computing system 202, may execute within the cloud computing system 202, and/or may be hosted within the cloud computing system 202, in some implementations, system 115 may not be cloud-based (e.g., may be implemented outside of a cloud computing system) or may be partially cloud-based. For example, system 115 may include one or more devices that are not part of the cloud computing system 202, such as device 300 of FIG. 3, which may include a standalone server or another type of computing device. System 115 may perform one or more operations and/or processes described in more detail elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
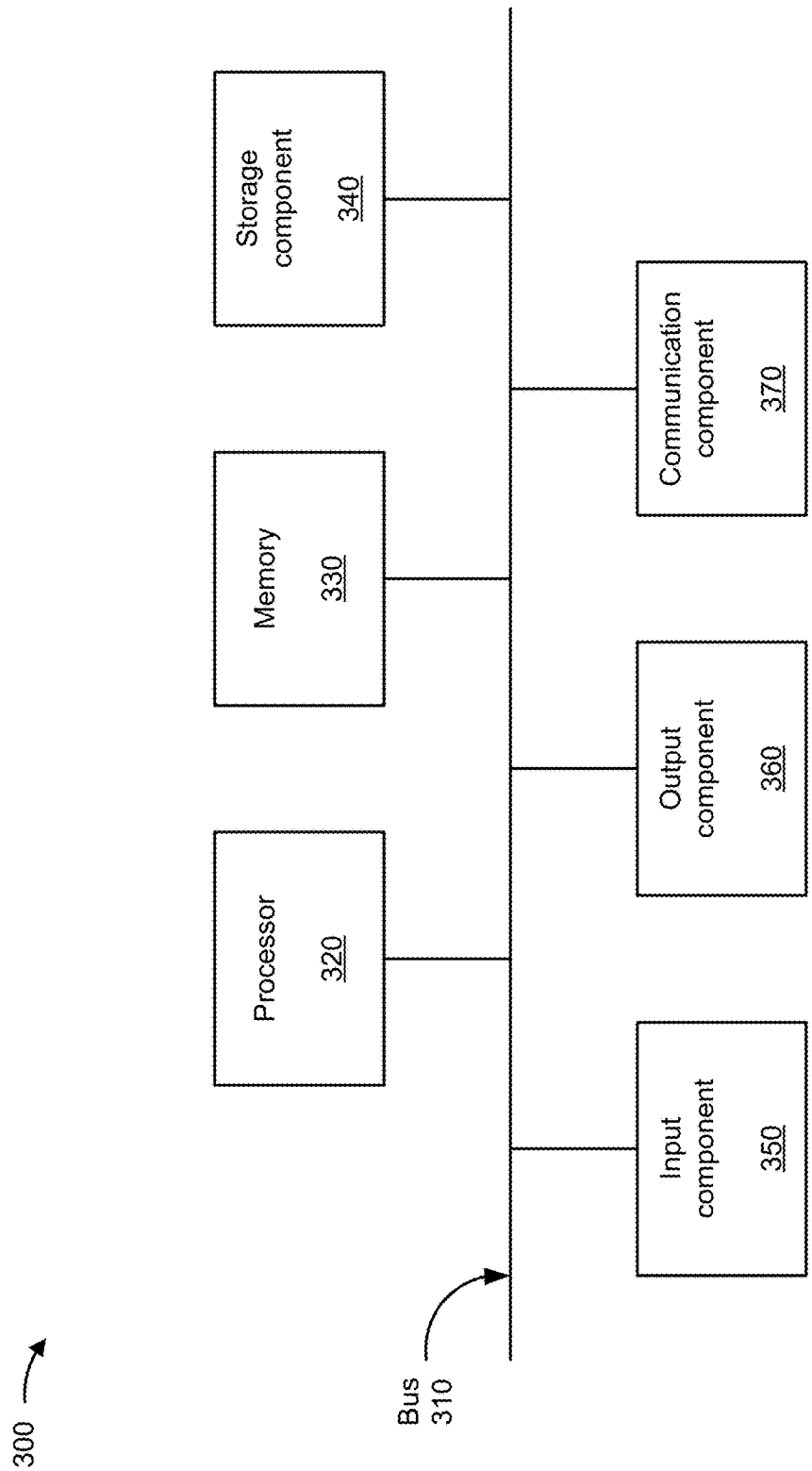
FIG. 3 is a diagram of example components of one or more devices of FIG. 2.

FIG. 3 is a diagram of example components of a device 300, which may correspond to system 115 and/or network device 110. In some implementations, system 115 and/or network device 110 may include one or more devices 300 and/or one or more components of device 300. As shown in FIG. 3, device 300 may include a bus 310, a processor 320, a memory 330, a storage component 340, an input component 350, an output component 360, and a communication component 370.

Bus 310 includes a component that enables wired and/or wireless communication among the components of device 300. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform a function. Memory 330 includes a random access memory, a read only memory, and/or another type of memory (e.g., a flash memory, a magnetic memory, and/or an optical memory).

Storage component 340 stores information and/or software related to the operation of device 300. For example, storage component 340 may include a hard disk drive, a magnetic disk drive, an optical disk drive, a solid-state disk drive, a compact disc, a digital versatile disc, and/or another type of non-transitory computer-readable medium. Input component 350 enables device 300 to receive input, such as user input and/or sensed inputs. For example, input component 350 may include a touch screen, a keyboard, a keypad, a mouse, a button, a microphone, a switch, a sensor, a global positioning system component, an accelerometer, a gyroscope, and/or an actuator. Output component 360 enables device 300 to provide output, such as via a display, a speaker, and/or one or more light-emitting diodes. Communication component 370 enables device 300 to communicate with other devices, such as via a wired connection and/or a wireless connection. For example, communication component 370 may include a receiver, a transmitter, a transceiver, a modem, a network interface card, and/or an antenna.

Device 300 may perform one or more processes described herein. For example, a non-transitory computer-readable medium (e.g., memory 330 and/or storage component 340) may store a set of instructions (e.g., one or more instructions, code, software code, and/or program code) for execution by processor 320. Processor 320 may execute the set of instructions to perform one or more processes described herein. In some implementations, execution of the set of instructions, by one or more processors 320, causes the one or more processors 320 and/or the device 300 to perform one or more processes described herein. In some implementations, hardwired circuitry may be used instead of or in combination with the instructions to perform one or more processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
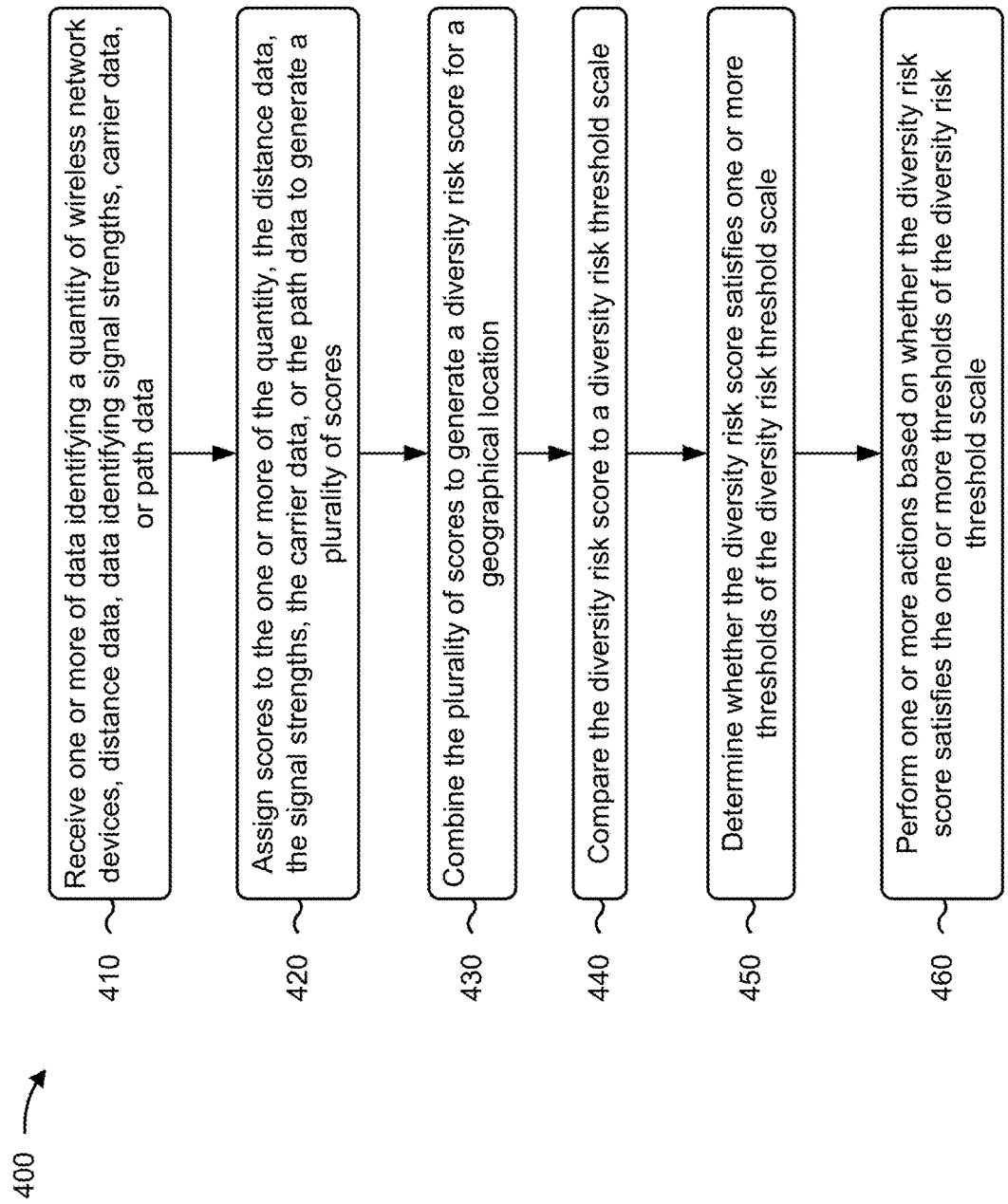
FIG. 4 is a flowchart of an example process for calculating a diversity risk score and applying the diversity risk score to wireless backup services.

FIG. 4 is a flowchart of an example process 400 associated with calculating a diversity risk score and applying the diversity risk score to wireless backup services. In some implementations, one or more process blocks of FIG. 4 may be performed by a device (e.g., system 115). In some implementations, one or more process blocks of FIG. 4 may be performed by another device or a group of devices separate from or including the device, such as a network device (e.g., network device 110). Additionally, or alternatively, one or more process blocks of FIG. 4 may be performed by one or more components of device 300, such as processor 320, memory 330, storage component 340, input component 350, output component 360, and/or communication component 370.

As shown in FIG. 4, process 400 may include receiving one or more of data identifying a quantity of wireless network devices, distance data, data identifying signal strengths, carrier data, or path data (block 410). For example, the device may receive one or more of data identifying a quantity of wireless network devices available for service in a geographical location, distance data identifying distances from the wireless network devices to the geographical location, data identifying signal strengths of the wireless network devices, carrier data identifying wireless and wireline carriers for the wireless network devices, or path data identifying wireline paths for the wireless network devices and wireline network devices, as described above.

The geographical location may be associated with an entity associated with the wireless network devices and/or the wireline network devices. The wireline network devices may provide a wireline private service for the entity at the geographical location and the wireless network devices may provide backup connectivity to the wireline private service.

As further shown in FIG. 4, process 400 may include assigning scores to the one or more of the quantity, the distance data, the signal strengths, the carrier data, or the path data to generate a plurality of scores (block 420). For example, the device may assign scores to the one or more of the quantity, the distance data, the signal strengths, the carrier data, or the path data to generate a plurality of scores, as described above. The plurality of scores may include a score associated with the quantity of wireless network devices available for service in the geographical location and a score associated with the distance data identifying the distances from the wireless network devices to the geographical location.

As further shown in FIG. 4, process 400 may include combining the plurality of scores to generate a diversity risk score for the geographical location (block 430). For example, the device may combine the plurality of scores to generate a diversity risk score for the geographical location, as described above. The diversity risk score may indicate a risk associated with sharing of the wireline paths by the wireless network devices and the wireline network devices.

As further shown in FIG. 4, process 400 may include comparing the diversity risk score to a diversity risk threshold scale (block 440). For example, the device may compare the diversity risk score to a diversity risk threshold scale, as described above. The diversity risk threshold scale may be dependent on which of the one or more of the quantity, the distance data, the signal strengths, the carrier data, or the path data is utilized to generate the plurality of scores.

As further shown in FIG. 4, process 400 may include determining whether the diversity risk score satisfies one or more thresholds of the diversity risk threshold scale (block 450). For example, the device may determine whether the diversity risk score satisfies one or more thresholds of the diversity risk threshold scale based on comparing the diversity risk score to the diversity risk threshold scale, as described above. The one or more thresholds may include a first threshold of the diversity risk threshold scale that is associated with a first diversity risk level, a second threshold of the diversity risk threshold scale that is associated with a second diversity risk level that is less than the first diversity risk level, and a third threshold of the diversity risk threshold scale that is associated with a third diversity risk level that is less than the second diversity risk level.

As further shown in FIG. 4, process 400 may include performing one or more actions based on whether the diversity risk score satisfies the one or more thresholds of the diversity risk threshold scale (block 460). For example, the device may perform one or more actions based on whether the diversity risk score satisfies the one or more thresholds of the diversity risk threshold scale, as described above. The device may monitor performance of the one or more actions to identify an additional action and may perform the additional action.

In some implementations, when performing the one or more actions, the device may cause one or more parameters to be changed for one of the wireless network devices, may cause traffic to be rerouted from a path associated with one of the wireless network devices to a different path, and/or may cause adjustment of one or more antennas for one of the wireless network devices. Alternatively, and/or additionally, the device may cause an autonomous vehicle and/or a technician to be dispatched to service one of the wireless network devices, may cause a new path to be installed for one of the wireless network devices, and/or may place an order for a new wireless network device.

In some implementations, when performing the one or more actions, the device may cause one or more parameters to be changed for one of the wireless network devices. The device may receive feedback associated with causing the one or more parameters to be changed. The device may cause the one or more parameters to be further changed for the one of the wireless network devices based on the feedback.

In some implementations, when performing the one or more actions, the device may cause traffic to be rerouted from a path associated with one of the wireless network devices to a different path. The device may receive feedback associated with causing the traffic to be rerouted from the path associated with the one of the wireless network devices to the different path. The device may cause traffic to be rerouted from the path associated with the one of the wireless network devices to another different path based on the feedback.

In some implementations, when performing the one or more actions, the device may cause adjustment of one or more antennas for one of the wireless network devices. The device may receive feedback associated with causing the one or more antennas to be adjusted. The device may cause further adjustment of the one or more antennas for the one of the wireless network devices based on the feedback.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
receiving, by a device, one or more of data identifying a quantity of wireless network devices available for service in a geographical location, distance data identifying distances from the wireless network devices to the geographical location, data identifying signal strengths of the wireless network devices at the geographical location, carrier data identifying wireless and wireline carriers for the wireless network devices, or path data identifying wireline paths for the wireless network devices and wireline network devices;
assigning, by the device, scores to the one or more of the quantity, the distance data, the signal strengths, the carrier data, or the path data to generate a plurality of scores;
combining, by the device, the plurality of scores to generate a diversity risk score for the geographical location, wherein the diversity risk score is associated with a risk of the wireless network devices being unable to provide backup connectivity for the wireline network devices;
comparing, by the device, the diversity risk score to a diversity risk threshold scale;
determining, by the device, whether the diversity risk score satisfies one or more thresholds of the diversity risk threshold scale based on comparing the diversity risk score to the diversity risk threshold scale,
wherein a first threshold of the one or more thresholds is associated with a first risk of the wireless network devices being unable to provide backup connectivity for the wireline network devices, and
wherein a second threshold of the one or more thresholds is associated with a second risk of the wireless network devices being unable to provide backup connectivity for the wireline network devices; and
performing, by the device, one or more actions based on whether the diversity risk score satisfies the one or more thresholds of the diversity risk threshold scale.

2. The method of claim 1, further comprising:
monitoring performance of the one or more actions to identify an additional action; and
performing the additional action.

3. The method of claim 1, wherein performing the one or more actions comprises one or more of:
causing one or more parameters to be changed for one of the wireless network devices available for service in the geographical location;
causing traffic to be rerouted from a path associated with one of the wireless network devices available for service in the geographical location to a different path; or
causing adjustment of one or more antennas for one of the wireless network devices.

4. The method of claim 1, wherein performing the one or more actions comprises one or more of:
- deploying a temporary cell at the geographical location;
- causing a technician to be dispatched to service one of the wireless network devices;
- causing a new path to be installed for one of the wireless network devices; or
- placing an order for a new wireless network device.

5. The method of claim 1, wherein the geographical location is associated with an entity associated with the wireless network devices and the wireline network devices.

6. The method of claim 1, wherein the wireline network devices provide a wireline private service for an entity at the geographical location and the wireless network devices provide backup connectivity to the wireline private service.

7. The method of claim 1, wherein combining the plurality of scores to generate the diversity risk score for the geographical location comprises:
- computing a sum of the scores assigned to the one or more of the quantity, the distance data, the signal strengths, the carrier data, or the path data to generate the diversity risk score for the geographical location.

8. A device, comprising:
one or more processors configured to:
- receive one or more of data identifying a quantity of wireless network devices available for service in a geographical location, distance data identifying distances from the wireless network devices to the geographical location, data identifying signal strengths of the wireless network devices at the geographical location, carrier data identifying wireless and wireline carriers for the wireless network devices, or path data identifying wireline paths for the wireless network devices and wireline network devices;
- assign scores to the one or more of the quantity, the distance data, the signal strengths, the carrier data, or the path data to generate a plurality of scores;
- combine the plurality of scores to generate a diversity risk score for the geographical location, wherein the diversity risk score is associated with a risk of the wireless network devices being unable to provide backup connectivity for the wireline network devices;
- compare the diversity risk score to a diversity risk threshold scale;
- determine whether the diversity risk score satisfies one or more thresholds of the diversity risk threshold scale based on comparing the diversity risk score to the diversity risk threshold scale,
  - wherein a first threshold of the one or more thresholds is associated with a first risk of the wireless network devices being unable to provide backup connectivity for the wireline network devices, and
  - wherein a second threshold of the one or more thresholds is associated with a second risk of the wireless network devices being unable to provide backup connectivity for the wireline network devices; and
- perform one or more actions based on whether the diversity risk score satisfies the one or more thresholds of the diversity risk threshold scale; and
- monitor performance of the one or more actions.

9. The device of claim 8, wherein:
the first threshold is associated with a first diversity risk level,
the second threshold is associated with a second diversity risk level that is less than the first diversity risk level, and
a third threshold of the diversity risk threshold scale is associated a third diversity risk level that is less than the second diversity risk level.

10. The device of claim 9, wherein:
the first diversity risk level is associated with a high risk of the wireless network devices being unable to provide backup connectivity for the wireline network devices,
the second diversity risk level is associated with a medium risk of the wireless network devices being unable to provide backup connectivity for the wireline network devices, and
the third diversity risk level is associated with a low risk of the wireless network devices being unable to provide backup connectivity for the wireline network devices.

11. The device of claim 8, wherein the one or more processors are configured to, when performing the one or more actions:
- cause one or more parameters to be changed for one of the wireless network devices;
- receive feedback associated with causing the one or more parameters to be changed; and
- cause the one or more parameters to be further changed for the one of the wireless network devices based on the feedback.

12. The device of claim 8, wherein the one or more processors are configured to, when performing the one or more actions:
- cause traffic to be rerouted from a path associated with one of the wireless network devices to a different path;
- receive feedback associated with causing the traffic to be rerouted from the path associated with the one of the wireless network devices to the different path; and
- cause traffic to be rerouted from the path associated with the one of the wireless network devices to another different path based on the feedback.

13. The device of claim 8, wherein the one or more processors are configured to, when performing the one or more actions:
- cause adjustment of one or more antennas for one of the wireless network devices;
- receive feedback associated with causing the one or more antennas to be adjusted; and
- cause further adjustment of the one or more antennas for the one of the wireless network devices based on the feedback.

14. The device of claim 8, wherein the plurality of scores include at least:
- a score associated with the quantity of wireless network devices available for service in the geographical location, and
- a score associated with the distance data identifying the distances from the wireless network devices to the geographical location.

15. A non-transitory computer-readable medium storing a set of instructions, the set of instructions comprising:
one or more instructions that, when executed by one or more processors of a device, cause the device to:
- receive data identifying a quantity of wireless network devices available for service in a geographical location and distance data identifying distances from the wireless network devices to the geographical location;
- assign scores to the quantity and the distance data to generate a plurality of scores;

combine the plurality of scores to generate a diversity risk score for the geographical location, wherein the diversity risk score is associated with a risk of the wireless network devices being unable to provide backup connectivity for wireline network devices;
compare the diversity risk score to a diversity risk threshold scale;
determine whether the diversity risk score satisfies one or more thresholds of the diversity risk threshold scale based on comparing the diversity risk score to the diversity risk threshold scale,
  wherein a first threshold of the one or more thresholds is associated with a first risk of the wireless network devices being unable to provide backup connectivity for the wireline network devices, and
  wherein a second threshold of the one or more thresholds is associated with a second risk of the wireless network devices being unable to provide backup connectivity for the wireline network devices; and
perform one or more actions based on whether the diversity risk score satisfies the one or more thresholds of the diversity risk threshold scale.

16. The non-transitory computer-readable medium of claim 15, wherein the one or more instructions further cause the device to:
monitor performance of the one or more actions to identify an additional action; and
perform the additional action.

17. The non-transitory computer-readable medium of claim 15, wherein the one or more instructions, that cause the device to perform the one or more actions, cause the device to one or more of:
cause one or more parameters to be changed for one of the wireless network devices;
cause traffic to be rerouted from a path associated with one of the wireless network devices to a different path;
cause adjustment of one or more antennas for one of the wireless network devices;
cause an autonomous vehicle or a technician to be dispatched to service one of the wireless network devices;
cause a new path to be installed for one of the wireless network devices; or
place an order for a new wireless network device.

18. The non-transitory computer-readable medium of claim 15, wherein wireline network devices provide a wireline private service for an entity at the geographical location and the wireless network devices provide backup connectivity to the wireline private service.

19. The non-transitory computer-readable medium of claim 15, wherein the one or more instructions, that cause the device to perform the one or more actions, cause the device to:
cause one or more parameters to be changed for one of the wireless network devices;
receive feedback associated with causing the one or more parameters to be changed; and
cause the one or more parameters to be further changed for the one of the wireless network devices based on the feedback.

20. The non-transitory computer-readable medium of claim 15, wherein the one or more instructions, that cause the device to perform the one or more actions, cause the device to:
cause traffic to be rerouted from a path associated with one of the wireless network devices to a different path;
receive feedback associated with causing the traffic to be rerouted from the path associated with the one of the wireless network devices to the different path; and
cause traffic to be rerouted from the path associated with the one of the wireless network devices to another different path based on the feedback.

* * * * *